(12) United States Patent
Pulliam et al.

(10) Patent No.: US 10,377,195 B2
(45) Date of Patent: Aug. 13, 2019

(54) PIN BOX HAVING RECEIVER FOR INTERCHANGEABLE COUPLER

(71) Applicant: Pulliam Enterprises, Inc., Mishawaka, IN (US)

(72) Inventors: Randall A Pulliam, Mishawaka, IN (US); James M. Karasch, Elkhart, IN (US)

( * ) Notice: Subject to any disclaimer, the term of this patent is extended or adjusted under 35 U.S.C. 154(b) by 227 days.

(21) Appl. No.: 15/459,362

(22) Filed: Mar. 15, 2017

(65) Prior Publication Data

US 2017/0267040 A1   Sep. 21, 2017

Related U.S. Application Data

(60) Provisional application No. 62/308,931, filed on Mar. 16, 2016.

(51) Int. Cl.
| | | |
|---|---|---|
| B60D 1/07 | (2006.01) | |
| B60D 1/06 | (2006.01) | |
| B60D 1/52 | (2006.01) | |
| B60D 1/60 | (2006.01) | |
| B62D 53/08 | (2006.01) | |
| B60D 1/01 | (2006.01) | |
| B60D 1/48 | (2006.01) | |

(52) U.S. Cl.
CPC ............ *B60D 1/07* (2013.01); *B60D 1/015* (2013.01); *B60D 1/06* (2013.01); *B60D 1/488* (2013.01); *B60D 1/52* (2013.01); *B60D 1/60* (2013.01); *B62D 53/085* (2013.01)

(58) Field of Classification Search
CPC ... B60D 1/06; B60D 1/07; B60D 1/52; B60D 1/60; B60D 1/015; B60D 1/488; B62D 53/085
USPC ........................................................ 280/507
See application file for complete search history.

(56) References Cited

U.S. PATENT DOCUMENTS

| | | | | |
|---|---|---|---|---|
| 2,838,324 A | * | 6/1958 | Dalton | B62D 53/0842 280/407 |
| 5,890,728 A | * | 4/1999 | Zilm | B62D 53/08 280/406.2 |
| 6,971,660 B1 | * | 12/2005 | Putnam | B60D 1/065 280/416.1 |
| 7,121,574 B2 | * | 10/2006 | Bouwkamp | B62D 53/061 280/441.2 |
| 7,712,761 B2 | * | 5/2010 | Mater, Jr. | B60D 1/249 280/416.1 |
| 2005/0253361 A1 | | 11/2005 | Bouwkamp | |

* cited by examiner

*Primary Examiner* — Joseph M Rocca
*Assistant Examiner* — Felicia L. Brittman
(74) *Attorney, Agent, or Firm* — Botkin & Hall, LLP (57) ABSTRACT

A pin box is provided having a removable and reversible hitch. The removable hitch has a kingpin end and a ball end. The pin box has a skid plate with an aperture with a receiver that can receive and affix the removable hitch. The skid plate is reinforced to the receiver to carry the load when the ball end of the removable hitch is being used. A pin is slidable between a locked position where the removable hitch is retained and an unlocked position where the removable hitch is removable. The pin extends through an aperture in the removable hitch to affix the removable hitch to the pin box.

13 Claims, 15 Drawing Sheets

PIN BOX HAVING RECEIVER FOR INTERCHANGEABLE COUPLER

CROSS REFERENCE TO RELATED APPLICATIONS

This application claims the benefit of U.S. Provisional Application No. 62/308,931, filed Mar. 16, 2016, the disclosures of which are hereby incorporated by reference.

BACKGROUND OF THE INVENTION

Traditional pin boxes used on fifth wheel trailers are similar to those used on tractor trailer combinations. As such, the kingpin is typically welded to the skid plate on the pin box. At certain times a user of a fifth wheel trailer may want to change the kingpin for a different type of coupler to accommodate the use of a different type of hitch. Making such a change is desirable because a kingpin must be at a very specific height for its entry into the fifth wheel hitch and this means a fifth wheel hitch is not always a desirable hitch. The operator of the vehicle must back into the kingpin when it is at its proper height. Performing this task can be nearly impossible in locations other than a large, level, and flat surface. Thus, changing to a different type of coupler other than a kingpin may make connecting to the trailer easier than using a kingpin and fifth wheel combination.

SUMMARY OF THE INVENTION

The present disclosure describes a pin box that is commonly affixed to a towed trailer or mobile living quarters, such as an RV trailer. The pin box has a removable and reversible hitch. The hitch has a ball end and a kingpin end. The pin box has a skid plate that has an aperture that extends into a receiver. The skid plate is reinforced with a series of walls that serve to support and rigidify it. The reversible hitch can be assembled to the pin box with either the ball end or the kingpin end extending outwardly from the skid plate. A captured pin slides between a locked position and an unlocked position to affix the reversible hitch to the pin box. The locked position is defined by the captured pin extending through two of the reinforcing walls adjacent the receiver and the unlocked position is defined by the pin clear of the receiver to allow the reversible hitch to be removed or installed. The captured pin further includes a stop that prevents it from being completely removed and lost by the user. Additionally, an optional wedge plate can be installed adjacent the aperture on the skid plate to lock the pin box from rotating with respect to the fifth wheel on the towing vehicle. The wedge plate can also be affixed to a storage position to prevent it from becoming lost. An anti-rattle fastener can be tightened to the reversible hitch to further secure it to the pin box.

BRIEF DESCRIPTION OF THE DRAWINGS

A preferred embodiment of this invention has been chosen wherein.

DESCRIPTION OF THE PREFERRED EMBODIMENT

Figure 1:
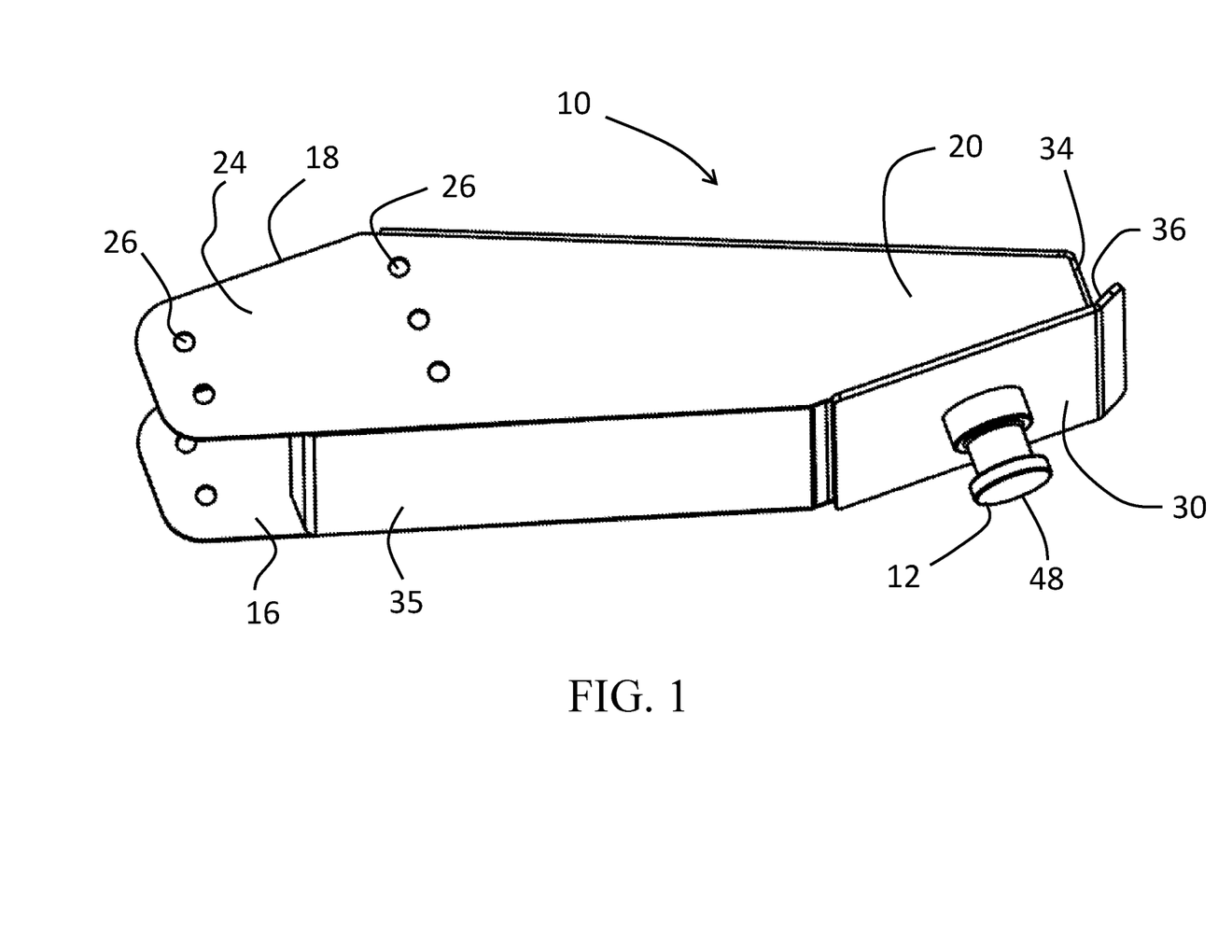
FIG. 1 is a isometric view of the pin box showing a kingpin installed.
Figure 2:
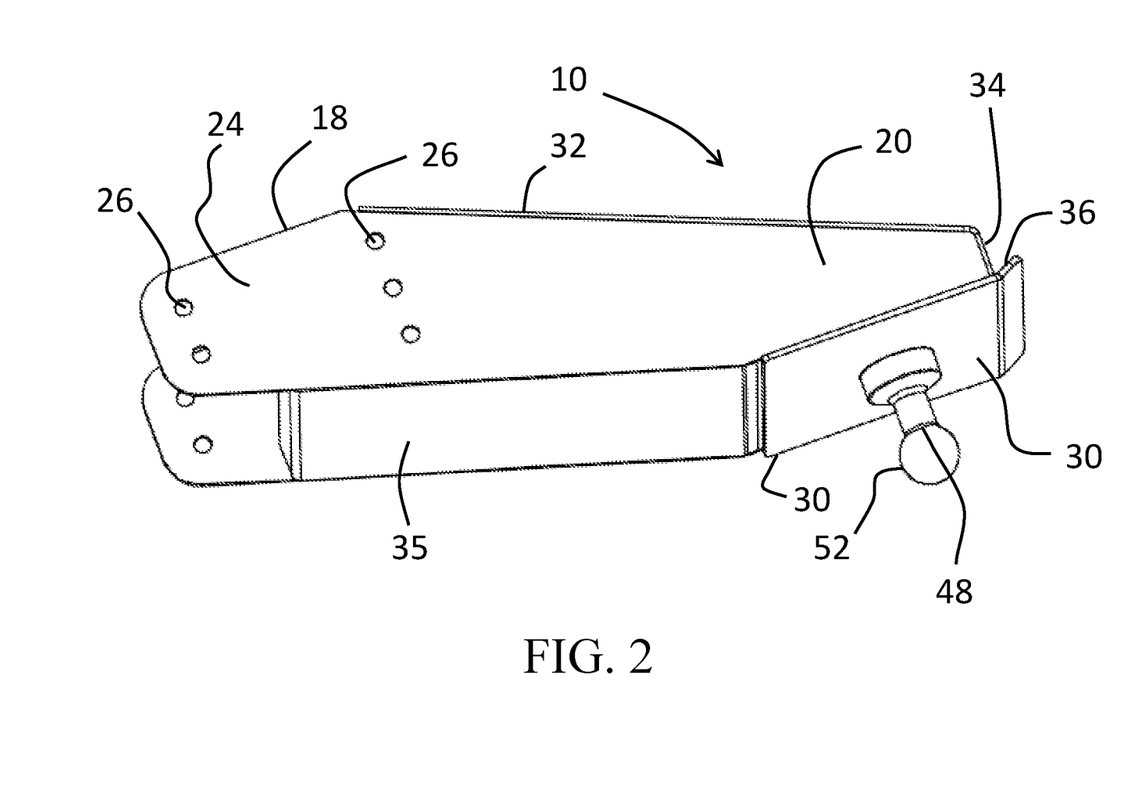
FIG. 2 is another isometric view of the pin box shown in FIG. 1 with the hitch ball installed.
Figure 3:
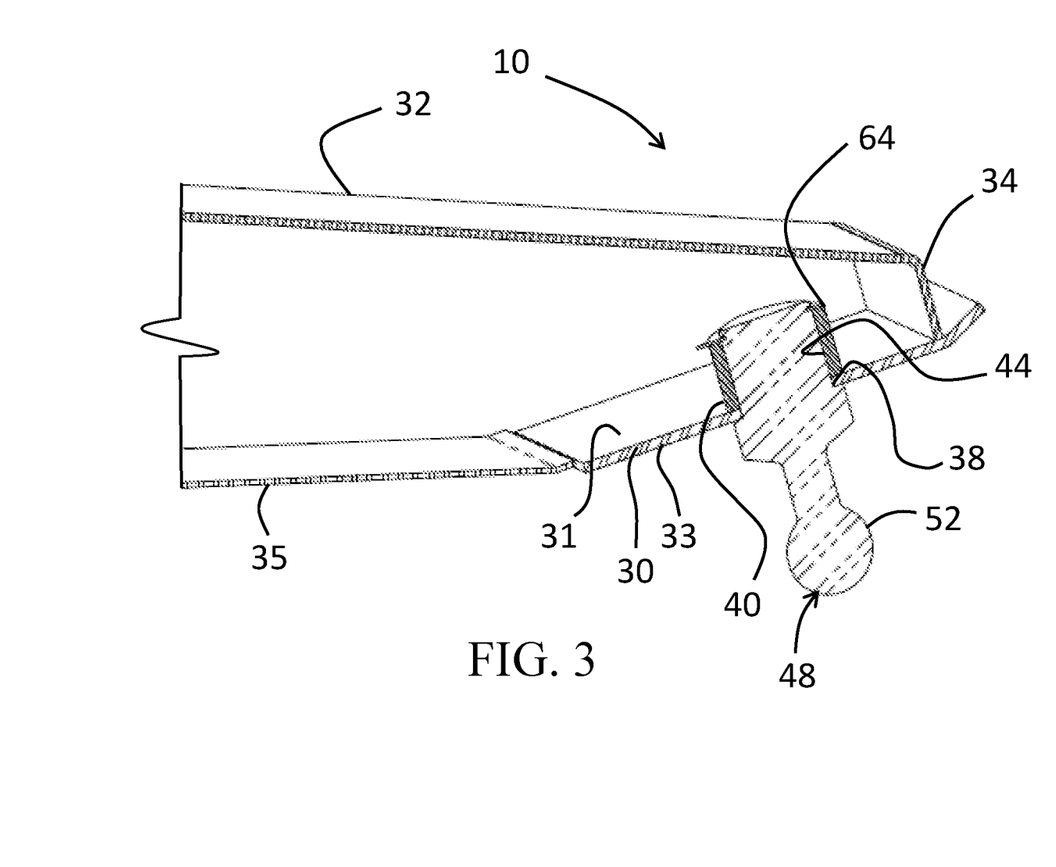
FIG. 3 is a sectional view of the pin box shown in FIG. 2 through its center.

FIG. 1 shows a pin box 10 that has a kingpin 12 installed and that is selectively removable. The pin box 10 has a first side plate 16 and a second side plate 18 that are held spaced apart and parallel. Each side plate 16, 18 has a hitch end 20 and a vehicle attachment end 24. Often the side plates 16, 18 are bolted to a trailer (not shown) using holes 26, however the side plates could be affixed to the trailer by other means. A skid plate 30 may be welded to the side plates 16, 18 and thus, sets the spaced distance of the side plates 16, 18, near the hitch end 20 of the pin box 10. The skid plate 30 has an upper surface 31 and a lower surface 33 as shown in FIG. 3. The skid plate 30 does not necessarily need to be welded to the pin box 10, but may float with respect to the pin box 10 through a damped connection. The skid plate 30 includes a ramp 36 that facilitates the mating with a fifth wheel on a towing vehicle (not shown). A number of floating type connections such as rubber dampers have been used to attach skid plates to pin boxes.

Further strength of the pin box 10 is added by having a top plate 32, FIGS. 2, 3, 4, and 7, that spans the top and encloses the pin box 10. The top plate 32 is bent down to have a nose plate 34 that encloses a front end of the pin box 10. Additionally, a bottom plate 35 spans the side plates 16, 18 to enclose the bottom and strengthen the pin box 10. Generally, the pin box 10 will be a fully enclosed box when it is installed on a trailer.

FIG. 3 shows a sectional view of the pin box 10 taken through its center. The skid plate 30, as shown in FIG. 3, has an aperture 38 that extends through the skid plate 30 into the interior of the pin box 10. Directly aligned and above the aperture 38 is a receiver 40 that rises above the upper surface 31 of the skid plate 30 and is joined to the skid plate 30. The receiver 40 has a bore 44, that extends upwardly above the skid plate 30 and the bore 44, which acts as a receiving receiver, is coaxial with the aperture 38 in the skid plate 30. The bore 44, as shown in FIG. 3, is a cylindrical bore, but this shape is not necessary. The bore 44 may be a square, rectangular, or another multi-sided geometric shape or could be of other non-circular cross section.

A hitch 48 is designed to be received into the bore 44. The hitch 48 is typically a kingpin 12 (as shown in FIG. 1) or a hitch ball 52 (as shown in FIG. 3). The bore 44 can interchangeably receive either the hitch ball 52 or kingpin 12 because each has a complementary shape to the bore 44. Each hitch 48 has a shank 56 extending upwardly of a connecting end 58. The shank 56 has a complementary shape that fits within the bore 44. Each hitch 48, shown in FIGS. 1-4, has a shoulder 60 that is located at the base of the shank 56. The shoulder 60 prevents the hitch 48 from being pressed into the pin box 10 more than the desired amount, and the shoulder 60 serves as a weight bearing surface for downward force of the tongue weight, which is particularly useful when using the hitch ball 52.

Figure 5:
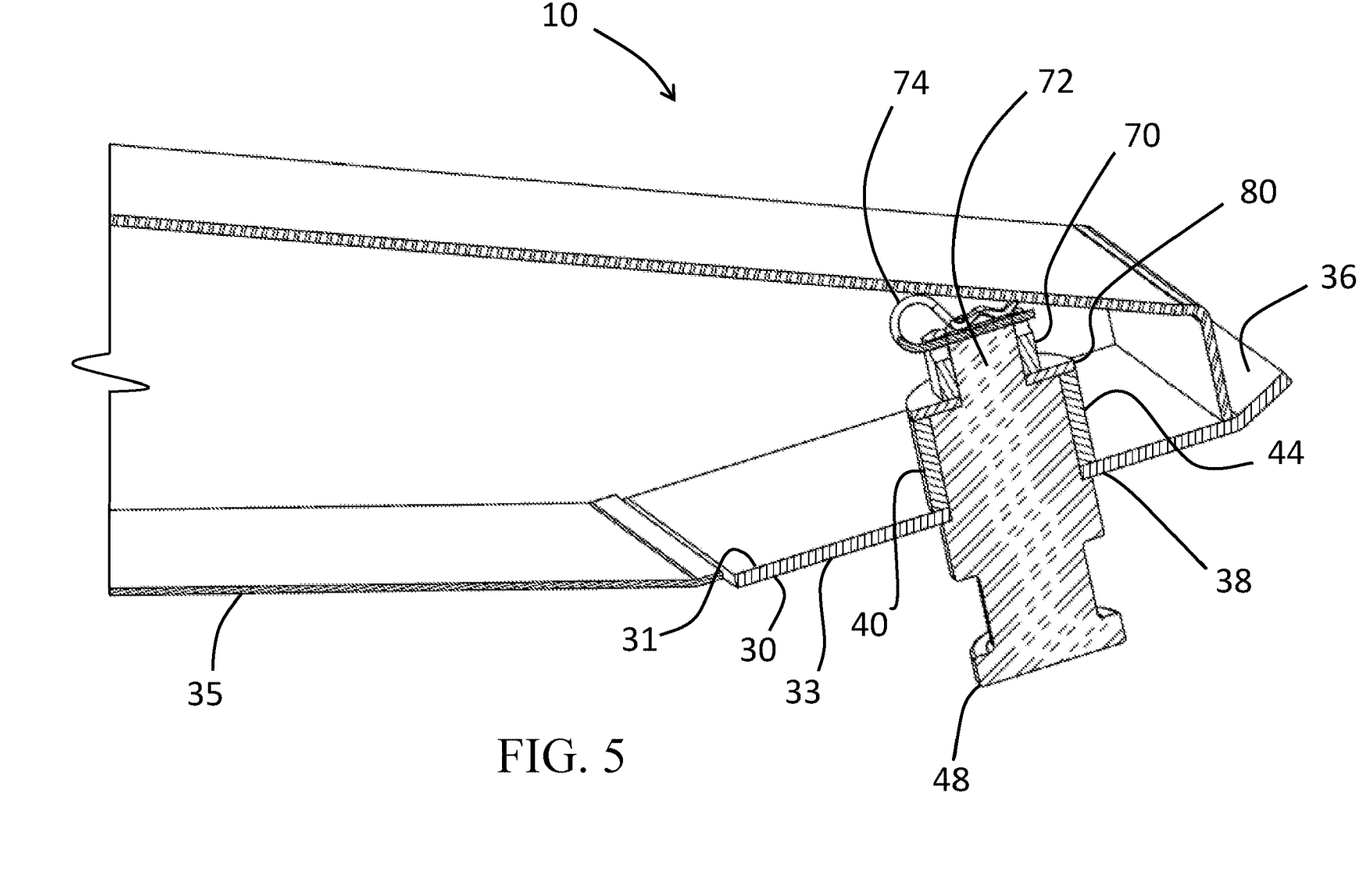
FIG. 5 is a isometric sectional view of a pin box with a kingpin installed.
Figure 6:
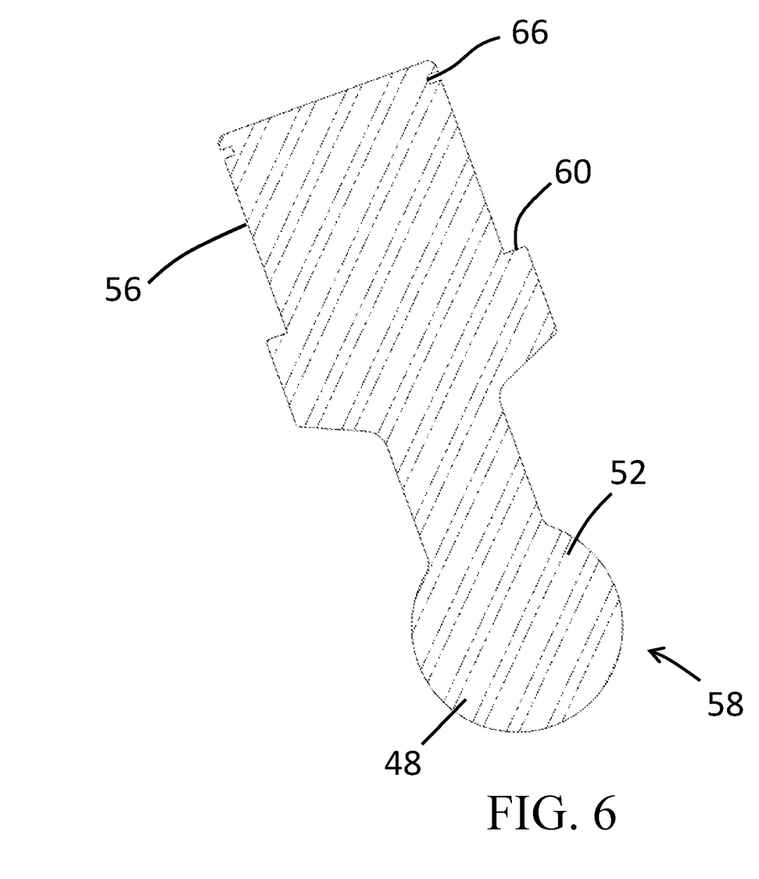
FIG. 6 is sectional view of a hitch ball like that used in FIG. 3.
Figure 7:
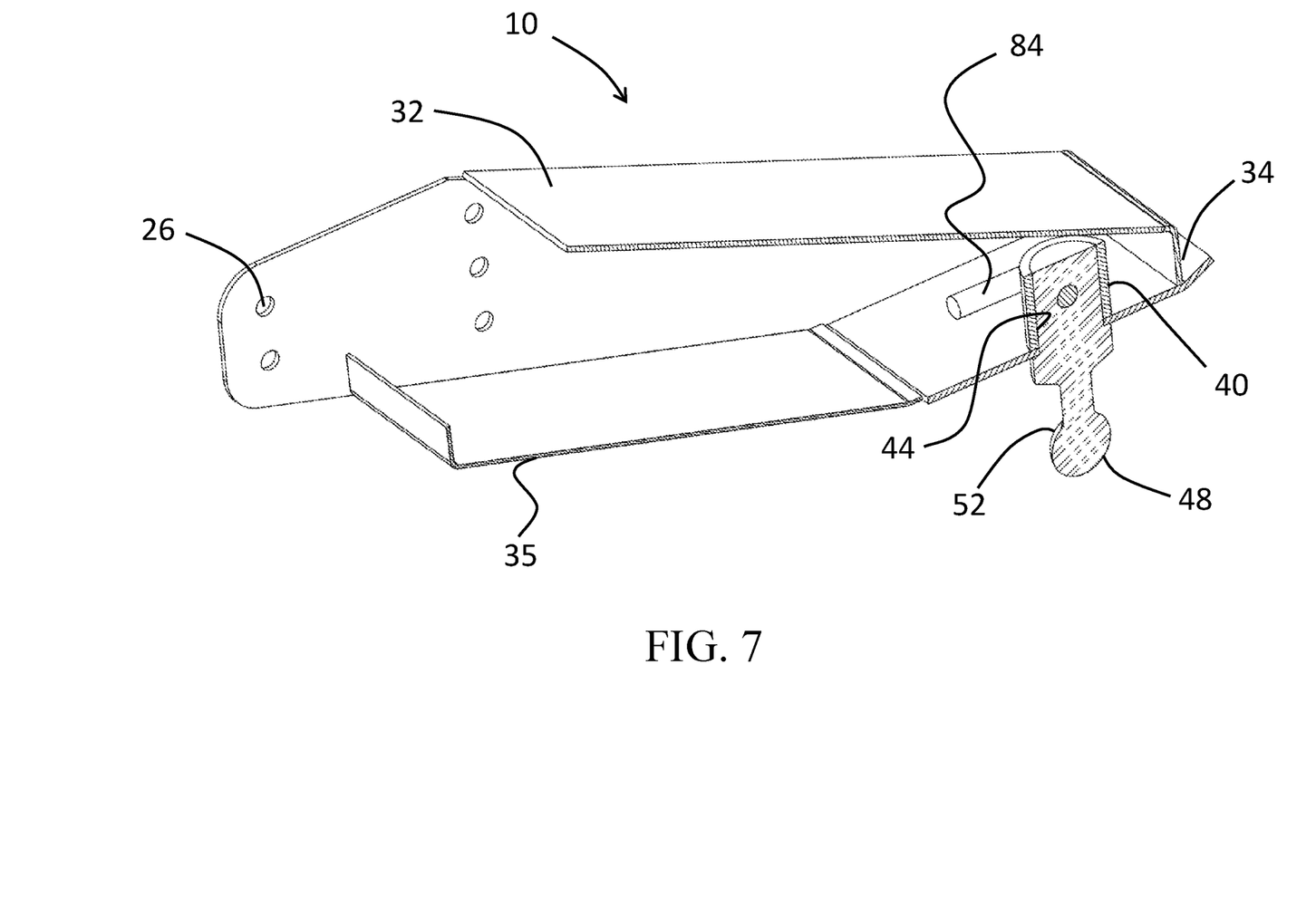
FIG. 7 is a sectional view of a pin box that uses a pin to lock the hitch ball in place.

The hitch 48 is releasably secured into the bore 44. This may be done by several means. One method of securing the hitch 48 into the bore 44 is to have a snap ring 64 that is received into a groove 66 on the shank 56. This is shown in FIG. 3. The snap ring 64 will rest on top of the receiver 40 and prevent the hitch 48 from being pulled from the pin box 10. FIG. 5 shows a castellated nut 70 that is tightened onto a stud 72 that extends from the top of the shank 56. The castellated nut 70 is restrained from loosening rotation by cotter pin 74. In this case the castellated nut 70 is tightened against a receiver end wall 80 that defines the top of the bore 44. FIG. 7 shows a pin 84 that is received in an aperture in the receiver 40 and the shank 56 of the hitch 48. The pin 84 not only holds the hitch 48, but also prevents its rotation with respect to the pin box 10. This pin 84 may have a detent ball or other locking feature to prevent it from being dislodged. Other mechanisms for holding the hitch 48 into the receiver may be used as well.

One embodiment of the pin box 90 is shown in FIGS. 8-15. The pin box 90 shares a significant amount of components as the pin box 10 shown in FIGS. 1-7 but includes a reversible hitch 92. The reversible hitch 92 has a kingpin end 94, a ball end 96, and a central axis 68. The hitch 92 has a connecting portion 102 that joins the kingpin end 94 and ball end 96. It is contemplated that either the kingpin end 94 or the ball end 96 may exist alone and extend from the connecting portion 102. The reversible hitch 92 having both ends 94, 96 is shown separate from the pin box 90 in FIG. 10. The ball end 96 has a spherical surface 98 that can be received by an external receiver to affix the trailer and pin box 90 to a towing vehicle (not shown). When the ball end 96 is used, the tongue weight of the trailer is carried by the ball end 96. The kingpin end 94 has an undercut surface 100 and can be received by a kingpin receiver to affix the trailer and pin box 90 to a towing vehicle (not shown). When the kingpin end 94 is used, the tongue weight of the trailer is carried by the skid plate 30. The connecting portion 102 has an outer surface 104 and an aperture 106. The aperture 106 is used to affix the reversible hitch 92 to the pin box 90. As shown, the outer surface 104 is cylindrical but other shapes are contemplated, such as square, rectangular, hexagonal or another geometric shape. The aperture 106 is shown as located transversely through the center of the outer surface 104, but it is contemplated that the aperture 106 may be offset. The outer surface 104 may include a notch (not shown) that can instead be used to affix the reversible hitch 92 to the pin box 90.

Figure 4:
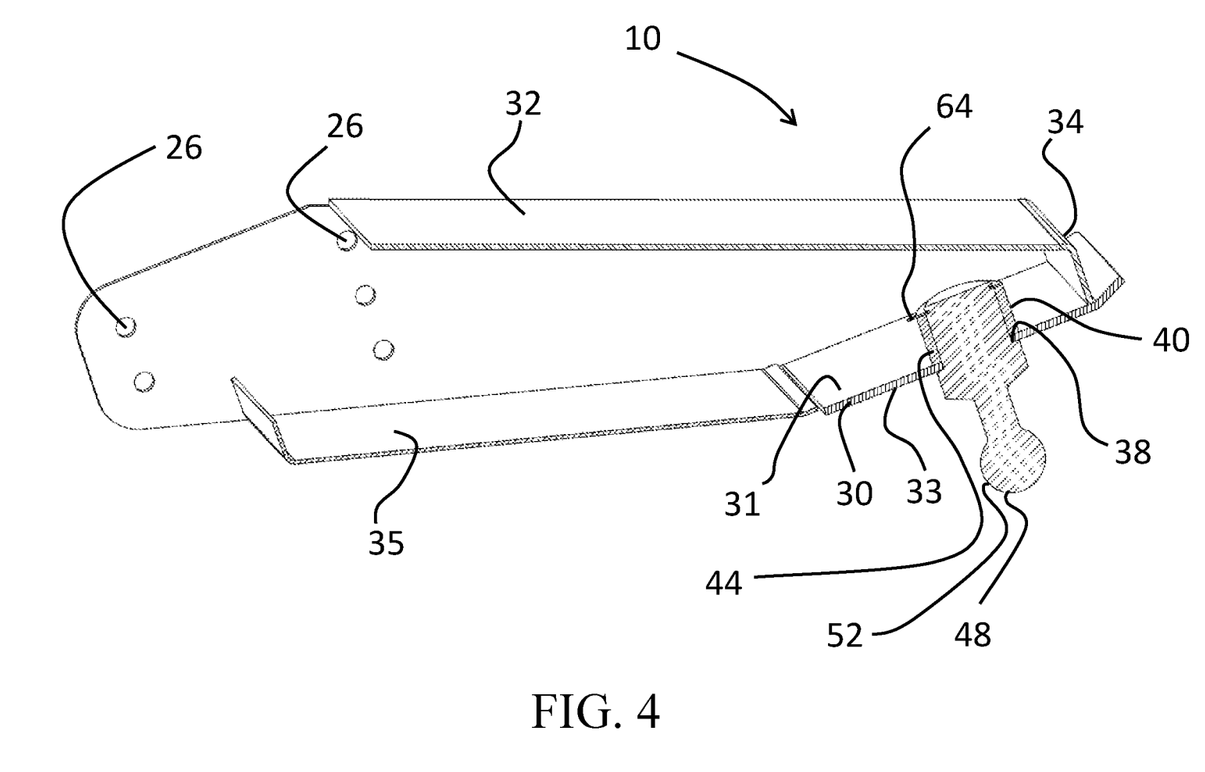
FIG. 4 is a sectional view of the pin box shown in FIG. 2 through its center at a slightly different angle than that of FIG. 3.
Figure 8:
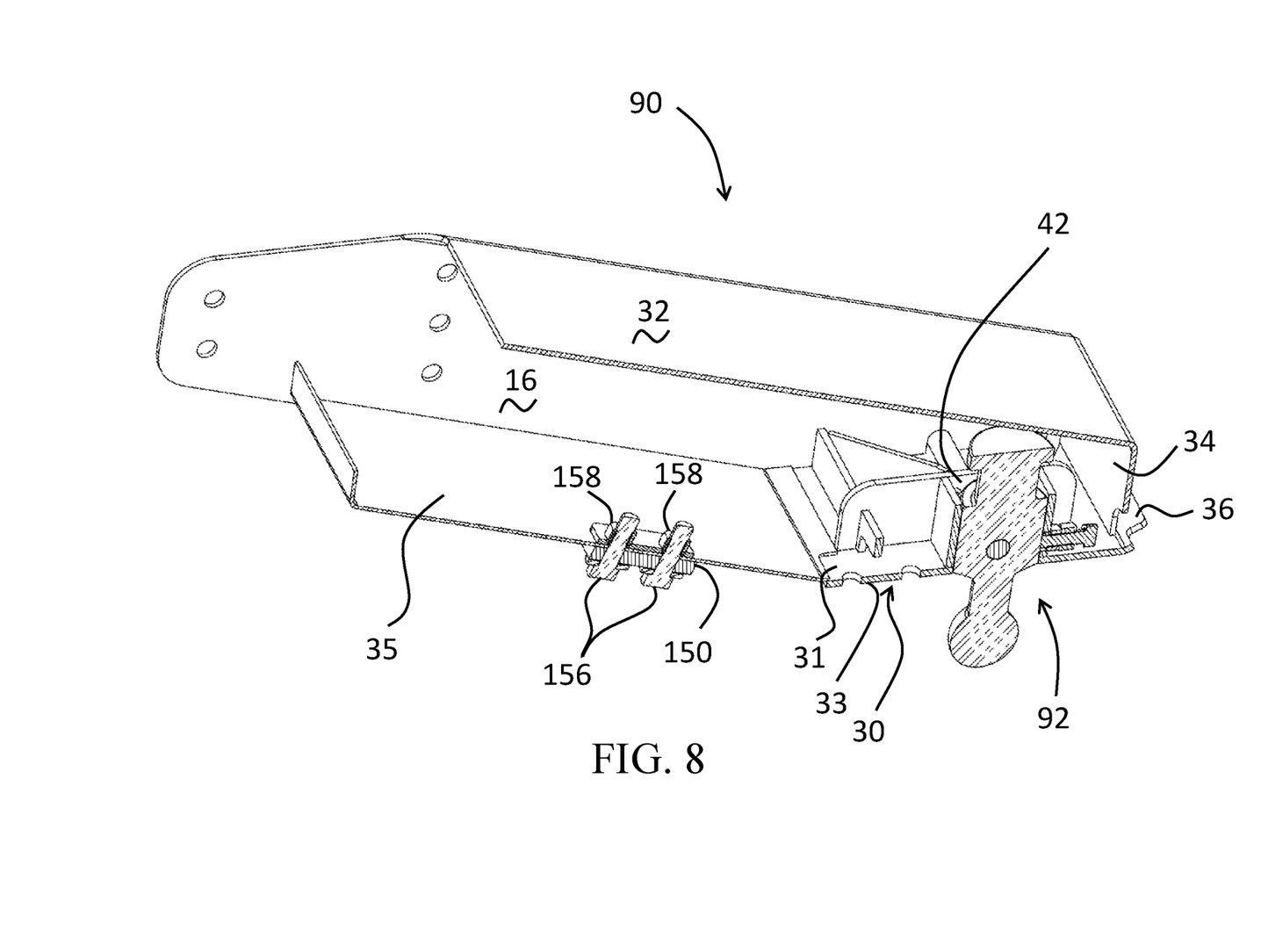
FIG. 8 is an isometric section view of the pin box with a reversible hitch.
Figure 9:
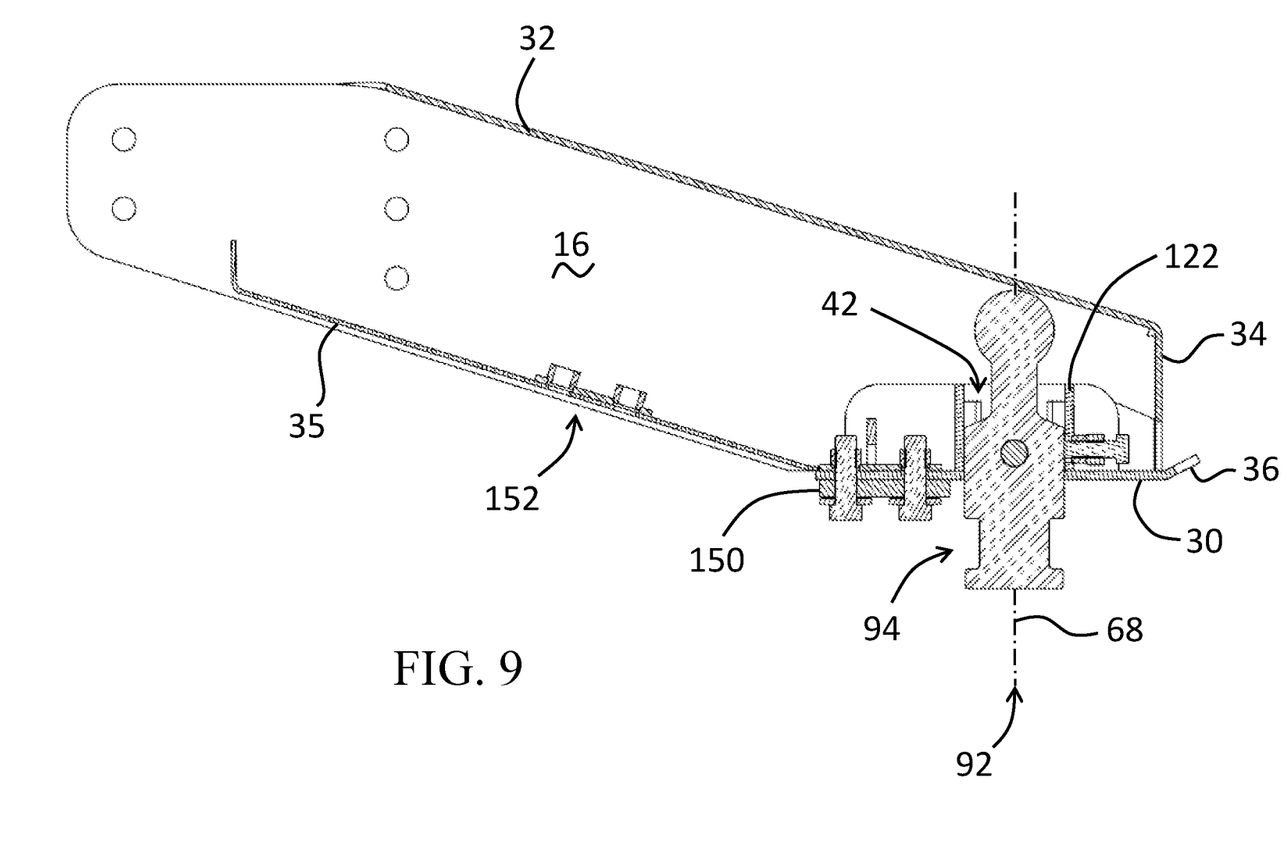
FIG. 9 is side section view of the pin box.
Figure 10:
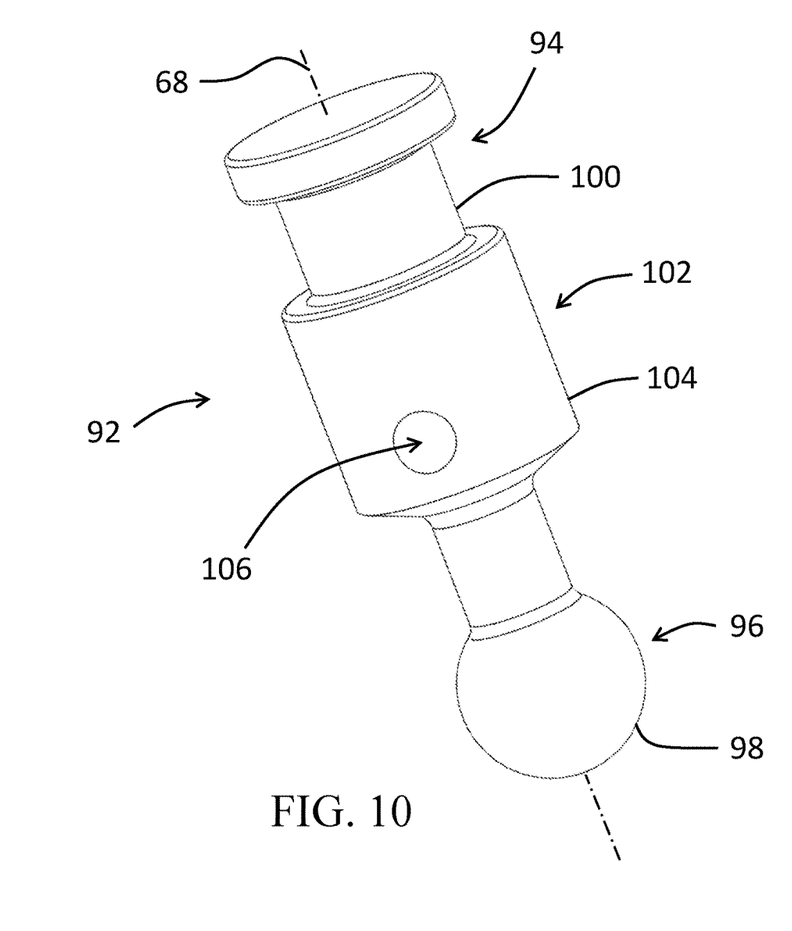
FIG. 10 is an isometric view of the reversible hitch shown in FIGS. 8 and 9.

The pin box 90 is shown sectioned in FIGS. 8 and 9 and has a skid plate 30 with an upper surface 31 and a lower surface 33. The skid plate 30 has a centrally located aperture 38 that extends through into a receiver 105. The aperture 38 is sized to allow either the ball end 96 or kingpin end 96 to pass through. The aperture must also allow the connecting portion 102 to pass through to allow one of the ends 94, 96 to be affixed to the pin box 90. The receiver 105 is shown in FIGS. 8 and 9. As shown, the receiver 105 is a combination of walls, but it is contemplated that the receiver 105 could be cylindrical as shown in FIGS. 3-5 or another series of walls that is complimentary to the outer surface 104 of the reversible hitch 92. The connecting portion 102 is adapted to be received in the receiver 105 in a complementary fashion.

Figure 11:
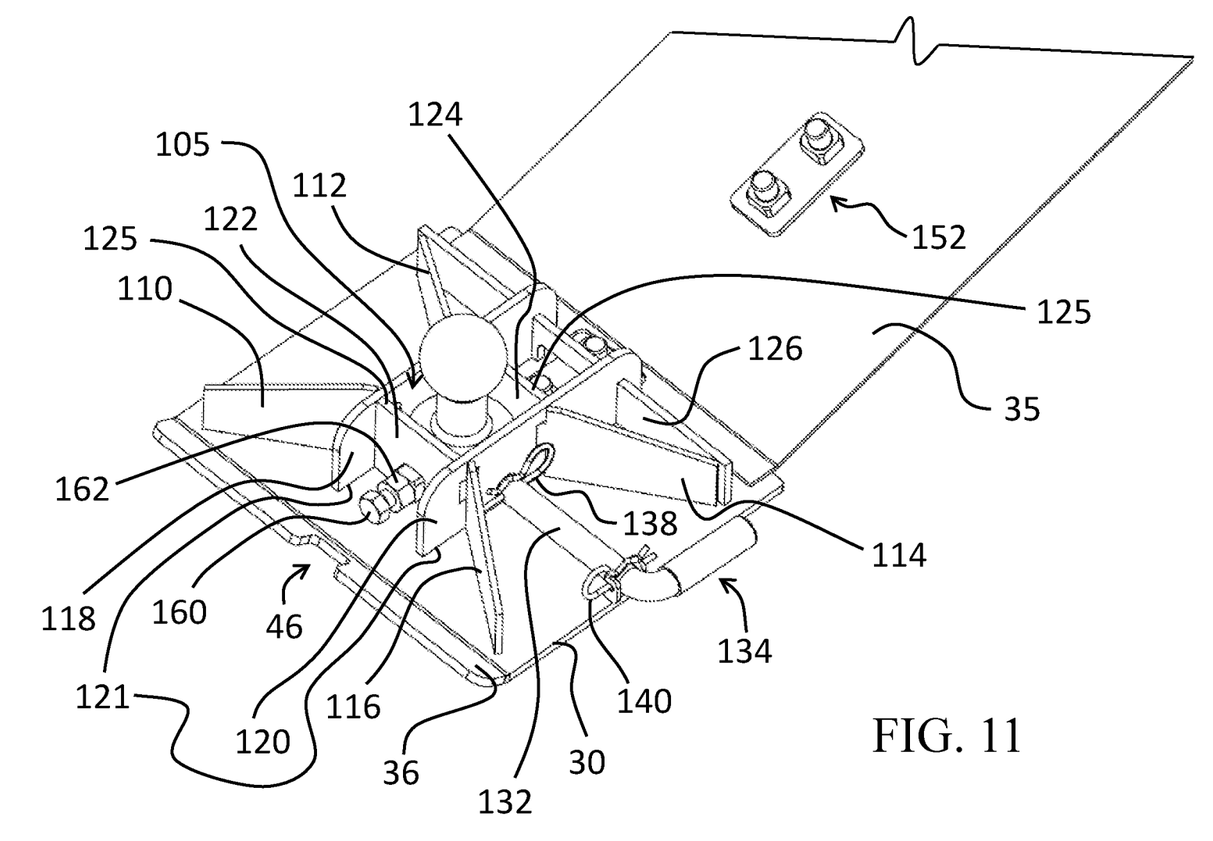
FIG. 11 is a top isometric view of the pin box with the top and sides removed.
Figure 12:
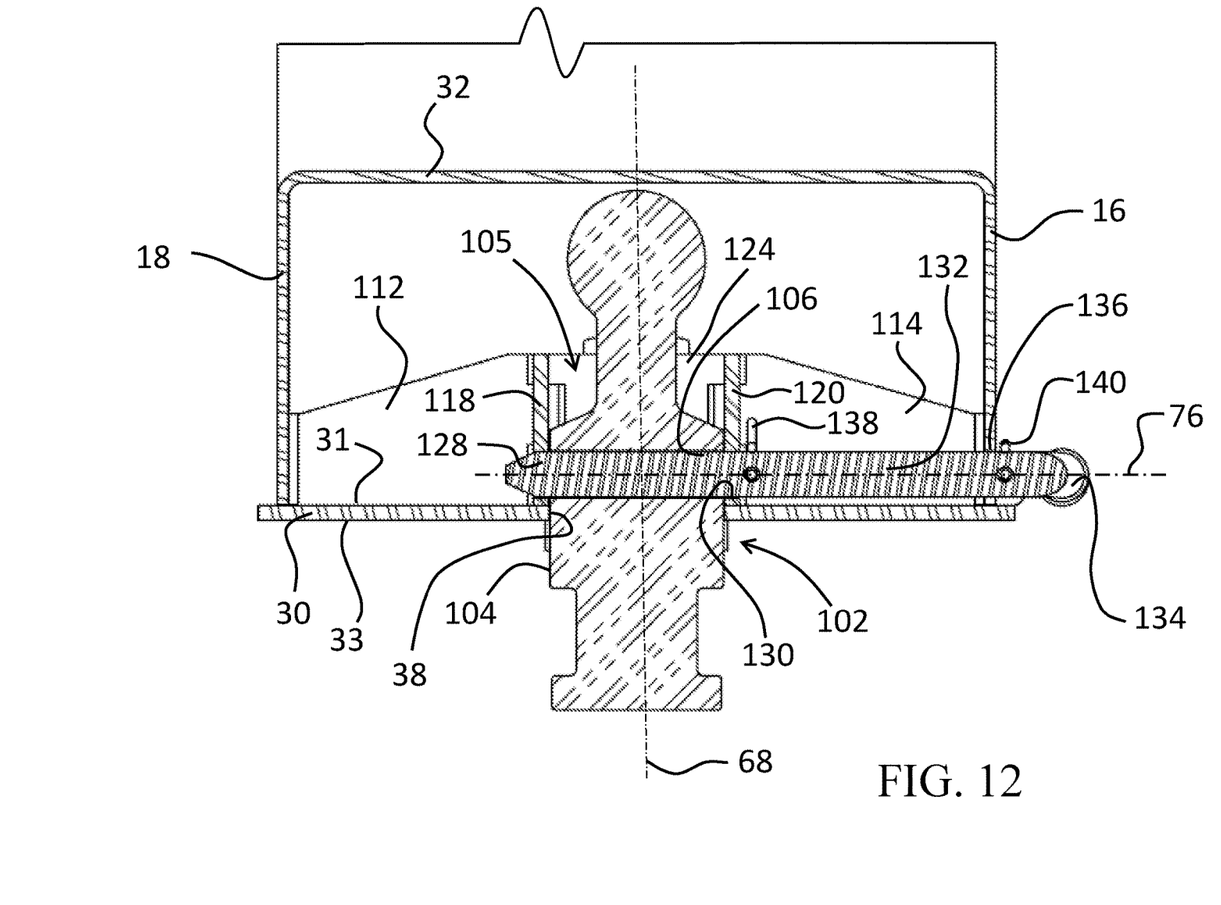
FIG. 12 is a front section view of the pin box through the center of the reversible hitch.
Figure 13:
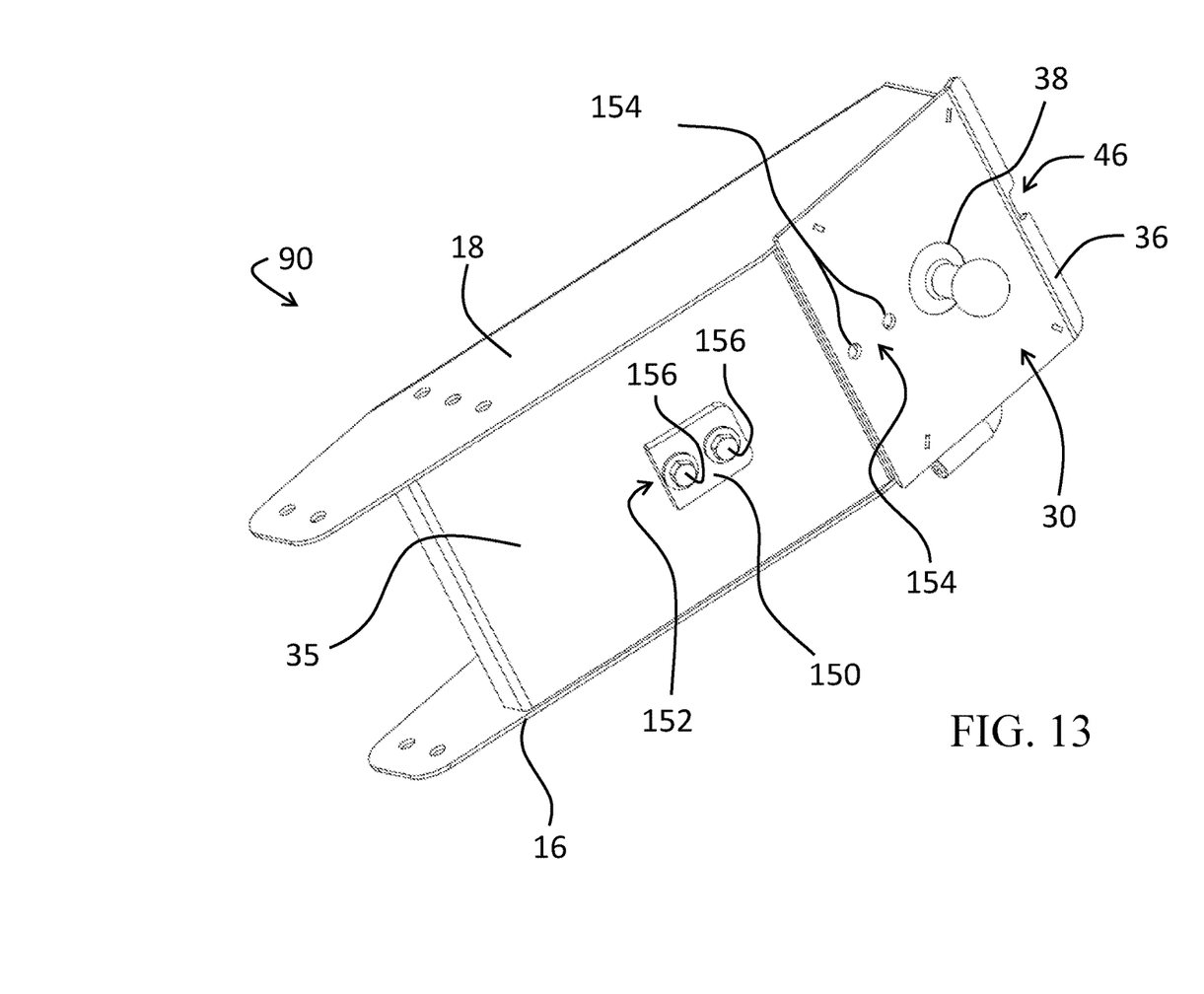
FIG. 13 is a bottom isometric view of the pin box with the ball end extending therefrom.
Figure 14:
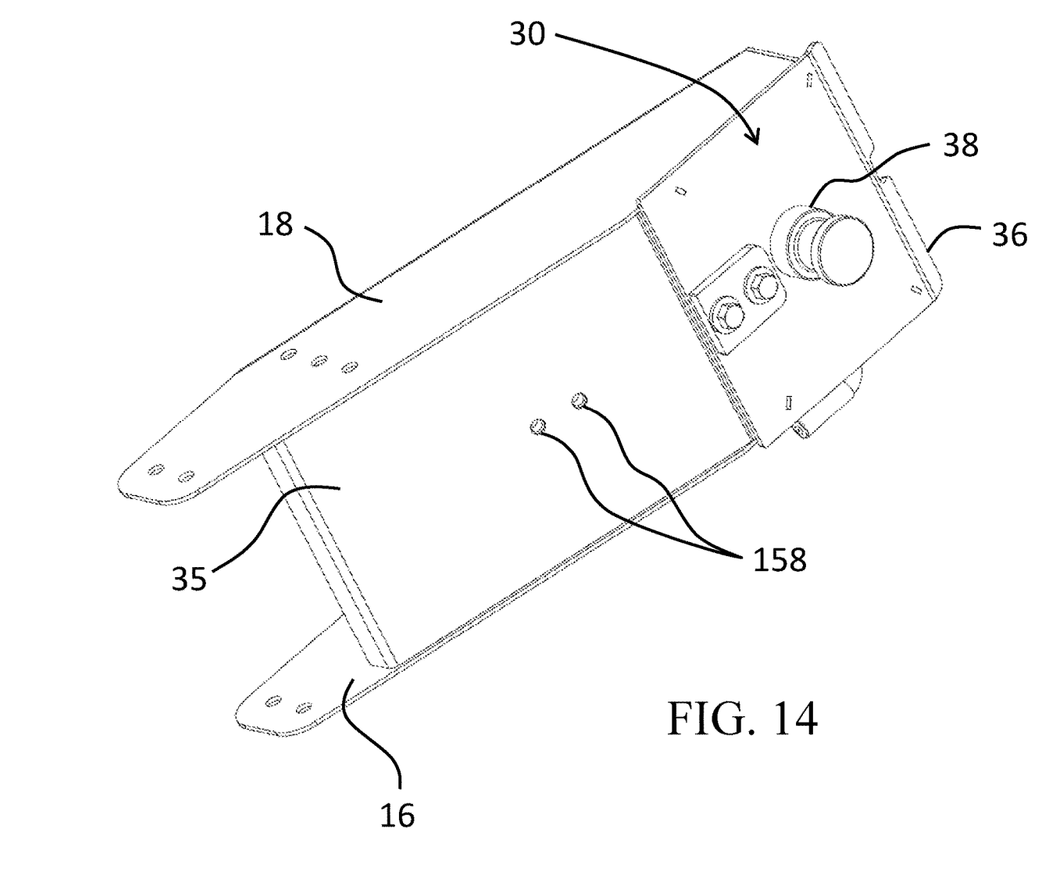
FIG. 14 is a bottom isometric view of the pin box with the kingpin end extending therefrom.
Figure 15:
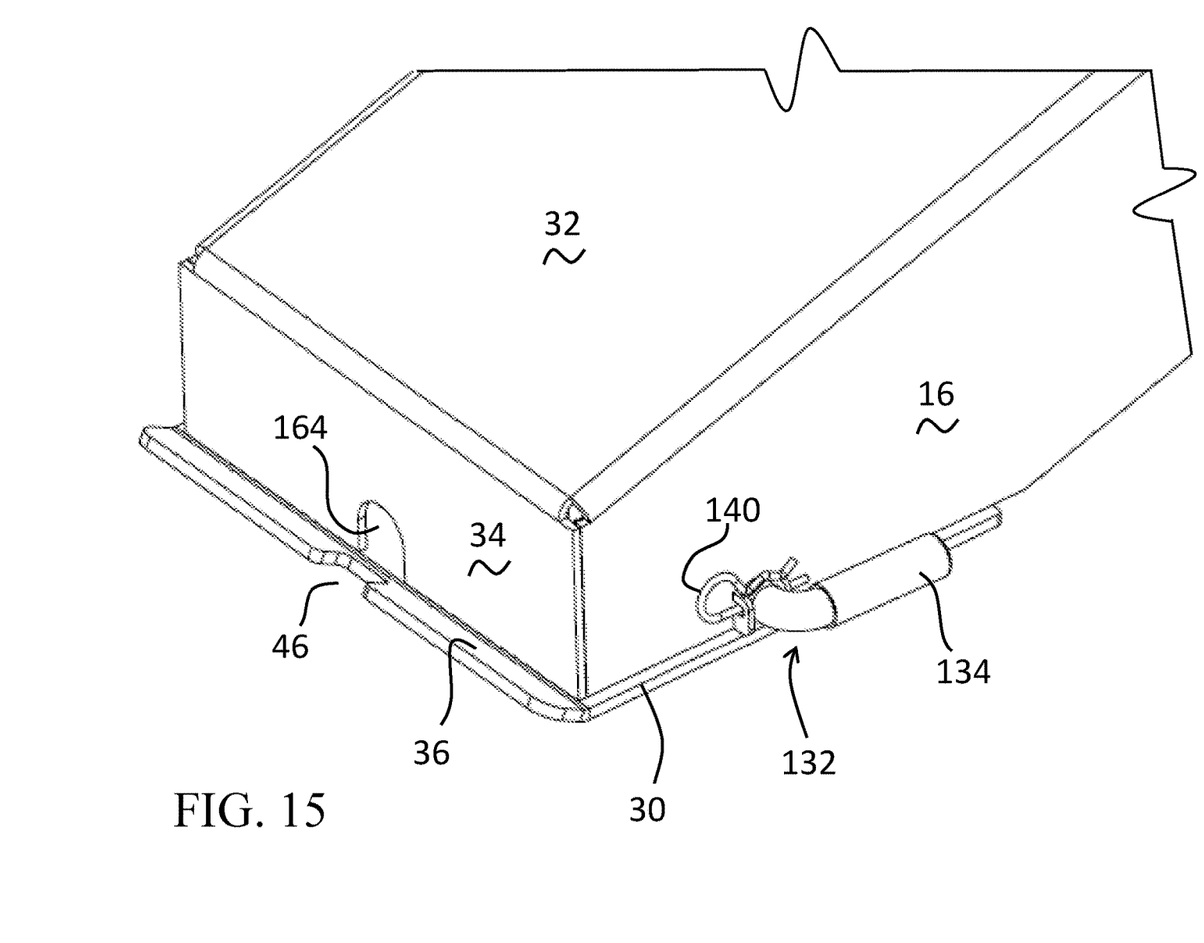
FIG. 15 is a partial top isometric view of the pin box shown in FIG. 11 with the top and sides shown.

FIG. 11 shows the pin box 90 with the side plates 16, 18 and top plate 32 removed. The pin box 90 has reinforcing walls 110, 112, 114, and 116 that are affixed to the skid plate 30. Adjacent the reinforcing walls 110, 112, 114, and 116 are walls that make up the receiver 42. Lateral receiver walls 118 and 120 are shown parallel and spaced apart. Transverse receiver walls 122, 124 span between the lateral receiver walls 118 and 120 and are joined at their ends to the lateral receiver walls 118, 120 to form the receiver 105. The lateral receiver walls 118 and 120 have lower edges 121 that are affixed to the upper surface 31 of the skid plate 30. The transverse receiver walls 122, 124 have lower edges 123 that are affixed to the upper surface 31 of the skid plate 30. The lateral receiver walls 118, 120 have upper edges defining the height that the lateral receiver walls 118, 120 extend above the upper surface 31 of the skid plate 30. The transverse receiver walls 122, 124 have upper edges 125 that define the height that the transverse receiver walls 122, 124 extend above the upper surface 31 of the skid plate 30. The lateral receiver walls 118, 120 extend beyond the transverse receiver walls 122, 124 and are joined along their entire lower edges 121 to the upper surface 31 of the skid plate 30. The transverse receiver walls 122, 124 are welded along their length where they contact the skid plate 30. As such, the lateral receiver walls 118, 120 substantially rigidify the skid plate 30, which would need to be much thicker without the additional support provided by the lateral receiver walls 118, 120. An additional wall 126 is located near the rear of the skid plate 30. This wall 126 interlocks with the lateral receiver walls 118, 120 to provide further rigidity to the skid plate 30. Lateral receiver walls 118 and 120 each have apertures 128 and 130 respectively. The apertures 128 and 130 receive a captured pin 132. The captured pin 132 has a central axis 76. The captured pin 132 affixes the reversible hitch 92 to the pin box 90. When the pin box 90 is configured with the ball end 96 facing out, the tongue weight of the trailer is carried by the captured pin 132 and transferred into the lateral receiver walls 118 and 120 and reinforcing walls 110, 112, 114, and 116. The reinforcing walls 110, 112, 114, and 116 diagonally radiate from lateral receiver walls 118, 120 to maximize the distribution of the load taken through the lateral receiver walls 118, 120 through the captured pin 132. The reinforcing walls 110, 112, 114, and 116 are connected to the lateral receiver walls 118, 120 in addition to be being connected to the skid plate 30. Further adding stiffness to the skid plate 30, the reinforcing walls 110, 112, 114, and 116 extend to the sidewalls 16, 18 and are joined to the sidewalls 16, 18. As shown in FIG. 12, the apertures 128, 130 are aligned. The captured pin 132 has a handle end 134 that extends through an aperture 136 in the side plate 16. The captured pin 132 is shown in a locked position where the captured pin 132 extends through the receiver 105 and apertures 128 and 130. The captured pin 132 is movable to an unlocked position where the captured pin 132 retracts from aperture 128. The captured pin 132 may also retract completely from aperture 130. In the unlocked position, the captured pin 132 is clear of the receiver 105 to allow the reversible hitch 92 to be removed completely. The captured pin 132 includes a stop 138 (shown as a hair pin cotter in FIGS. 11 and 12). The stop 138 prevents the captured pin 132 from being completely removed from the pin box 90. The stop 138 could be any shape; its purpose is to prevent complete removal of the captured pin 132 from the pin box 90. In the unlocked position, the stop 138 is close to or in contact with the side plate 16, and in the locked position, the stop 138 is close to or in contact with the wall 120. A lock 140 can be used to lock the captured pin 132 in the locked position. The lock 140 extends through a transverse hole in the captured pin 132 and a tab that is affixed to the side plate 16, as shown in FIG. 15.

An optional removable wedge plate 150 may be used when the user desires the pin box 90 to be fixed from rotation with respect to the towing vehicle's fifth wheel (not shown). The wedge plate 150 would be used in cooperation with the kingpin end 94. The wedge plate 150 is able to be affixed to a stored mount location 152 and a use mount location 154. The wedge plate 150 is affixed to the pin box 90 through threaded fasteners 156 that are received in tapped holes 158 in both locations 152, 154 in the pin box 90. The wedge plate 150, when affixed to the stored mount 152, does nothing; it is only to prevent the wedge plate 150 from being misplaced. When affixed to the use mount 154, the wedge plate 150 is received in the towing vehicle's fifth wheel lead-in slot to prevent relative rotation between the fifth wheel and the pin box 90.

An anti-rattle fastener 160 is threadably received in transverse wall 122. As shown in FIG. 11, a notch 46 in the ramp 36 and access hole 164 in the nose plate 34 allow access to the fastener 160. The fastener 160 includes a jamb nut 162. The jamb nut 162 has a larger size to allow the user to tighten the fastener 160 to the outer surface 104 of the reversible hitch 92, and then tighten the jamb nut 162 to prevent the fastener 160 from becoming loose. The fastener 160 applies pressure and biases the reversible hitch 92 toward the rear part of the receiver, particularly transverse wall 124, as shown in FIG. 11.

As shown in the FIGS. 8-15, the reversible hitch 92 can be affixed to the pin box 90 with the kingpin end 94 or the ball end 96 protruding below the lower surface 33 of the skid plate 30. To reverse or remove the reversible hitch 92, the user first will retract the fastener 160. Next, the user will remove the lock 140 and slide the captured pin 132 to the unlocked position. At that point, the reversible hitch 92 will be released and can be removed. The installation is the reverse of the removal.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A pin box adapted to be affixed to a tow-behind vehicle, said pin box comprising:
   a first side plate and a second side plate opposite to and spaced from said first side plate;
   a skid plate affixed to said first and second side plates, said skid plate including a lower surface and an upper surface, said skid plate having an aperture extending from said upper surface to said lower surface to a receiver, said skid plate having a ramp portion located on a leading edge, said skid plate having a trailing edge located opposite said ramp portion, said aperture located between said leading edge and said trailing edge;
   said receiver affixed to said upper surface of said skid plate, said receiver having a receiver axis being substantially perpendicular to said lower surface of said skid plate;
   a reversible hitch having a ball end and an oppositely located kingpin end, said reversible hitch having a connecting portion located between and connecting said kingpin end and said ball end, said connecting portion having a transverse hole extending therethrough, said reversible hitch adapted for being releasably secured within said receiver;
   a captured pin having a pin axis, said pin axis extending transversely through said receiver, said captured pin slidable on said pin axis between a locked position and an unlocked position, said locked position defined by said captured pin extending through said receiver; and
   when said connecting portion of said reversible hitch is located inside said receiver and said captured pin is in said locked position, said reversible hitch is affixed to said pin box.

2. The pin box of claim 1, further comprising a removable wedge plate, said removable wedge plate adapted to be affixed to said lower surface of said skid plate.

3. The pin box of claim 1, wherein said receiver axis is coaxial with said aperture in said skid plate.

4. The pin box of claim 1, wherein said receiver is rectangular in its cross section.

5. The pin box of claim 1, wherein said ramp portion has a notch, said notch is aligned with an anti-rattle fastener, said anti-rattle fastener adapted to impinge on said reversible hitch.

6. The pin box of claim 1, wherein said receiver axis orthogonally intersects said pin axis.

7. The pin box of claim 1, further comprising reinforcing walls affixed to said upper surface of said skid plate and said receiver.

8. The pin box of claim 1, wherein said captured pin includes a stop, said captured pin is located between said receiver and one of said side plates, when said captured pin is in said locked position, said stop is adjacent said receiver, when said captured pin is in said unlocked position, said stop is adjacent said one side plate.

9. The pin box of claim 1, wherein said captured pin is fixable to said pin box in said locked position.

10. The pin box of claim 1, further comprising an anti-rattle fastener threadably received in said receiver, said anti-rattle fastener adapted to impinge on said reversible hitch.

11. A pin box comprising:
    a first side plate and a second side plate opposite to and spaced from said first side plate;
    a skid plate affixed to said first and second side plates, said skid plate including a lower surface and an upper surface, said skid plate having an aperture extending therethrough to a receiver, said skid plate having a leading edge and a trailing edge located opposite said leading edge, said aperture located between said leading edge and said trailing edge;
    said receiver affixed to said upper surface of said skid plate, said receiver being substantially perpendicular to said lower surface of said skid plate;
    a removable hitch having a shoulder, said removable hitch having a connecting portion adapted to be received in said receiver to connect said removable hitch to said pin box, said receiver adapted to laterally restrain said removable hitch, said shoulder adapted to contact said lower surface of said skid plate, said connecting portion adapted to be retained within said receiver, said removable hitch extends through said receiver and is axially retained in said receiver with a snap ring, said snap ring affixable to said connecting portion; and when said removable hitch is affixed to said receiver, said shoulder of said removable hitch contacts said lower surface of said skid plate.

12. The pin box of claim 11, wherein said removable hitch extends through said receiver and is axially retrained in said receiver using a threaded fastener.

13. The pin box of claim 11, further comprising a removable wedge plate, said removable wedge plate adapted to be affixed to said lower surface of said skid plate.

* * * * *